(12) United States Patent
Jeong et al.

(10) Patent No.: US 6,727,709 B2
(45) Date of Patent: *Apr. 27, 2004

(54) VACUUM GAUGE USING PELTIER TIP

(75) Inventors: Yoon-Hee Jeong, Kyungsangbuk-do (KR); Dae-Hwa Jung, Kyungsangbuk-do (KR); Suk-Min Chung, Kyungsangbuk-do (KR); Chong-Do Park, Kyungsangbuk-do (KR)

(73) Assignee: Pohang University of Science and Technology Foundation, Kyungsangbuk-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 09/996,749

(22) Filed: Nov. 30, 2001

(65) Prior Publication Data

US 2002/0163345 A1 Nov. 7, 2002

(30) Foreign Application Priority Data

May 4, 2001 (KR) ......................................... 2001-24372

(51) Int. Cl.⁷ .......................... G01R 27/02; G01R 17/10
(52) U.S. Cl. ........................................ 324/610; 324/725
(58) Field of Search ............................. 324/610, 459, 324/460, 462, 715, 680, 725; 73/755

(56) References Cited

U.S. PATENT DOCUMENTS 4,959,999 A * 10/1990 Tamura ........................ 73/755
6,023,979 A * 2/2000 Bills et al. ..................... 73/755
6,593,760 B2 * 7/2003 Jeong et al. .................. 324/725

FOREIGN PATENT DOCUMENTS

KR  P 2001-103898  12/2001

* cited by examiner

*Primary Examiner*—Albert Decady
*Assistant Examiner*—James Kerveros
(74) *Attorney, Agent, or Firm*—Leydig, Voit & Mayer, Ltd.

(57) ABSTRACT

A thermal conduction vacuum gauge using a Peltier tip is provided. The vacuum gauge for measuring the pressure in a vacuum chamber includes: a signal generator that drives an electric current; an ammeter connected to the signal generator for measuring the current; a bridge circuit consisting of junctions of thermocouple wires, which is connected to the ammeter, wherein one junction of the dissimilar metallic wires is made in the form of a Peltier tip inserted into the vacuum chamber; and a lock-in amplifier connected to the two symmetrical points of the bridge circuit for detecting a voltage signal due to the temperature oscillation at the Peltier tip and thus measuring the pressure in the vacuum chamber. The thermal conduction vacuum gauge using a Peltier tip has a simple structure, and is of micron size, and operates at high sensitivity over a wide range of pressure, thereby enabling the measurements of a pressure at higher resolution than existing thermal conduction gauges while facilitating local pressure measurements.

4 Claims, 1 Drawing Sheet

VACUUM GAUGE USING PELTIER TIP

BACKGROUND OF THE INVENTION

1. Field of the Invention

The present invention relates to a thermal conduction vacuum gauge, and more particularly, to a vacuum gauge using a Peltier tip.

2. Description of the Related Art

According to the definition of the American Vacuum Society(1958) the term vacuum refers to a given space filled with gas at pressure below atmospheric pressure, i.e., having a density of molecules less than about $2.5 \times 10^{19}$ molecules/$cm^3$. Due to the advancement of vacuum technology, available vacuum range is between $10^{-13}$ Torr and atmospheric pressure(760 Torr). Pressure is measured with vacuum gauges operating on different principles depending on the pressure range being measured. A thermal conduction vacuum gauge is primarily used to measure the pressure in the range from $10^{-4}$ Torr to atmospheric pressure.

A filament heated in a vacuum loses energy due to thermal conduction through a metallic wire, gaseous thermal conduction, and thermal radiation. A thermal conduction vacuum gauge operates on the principle that gaseous thermal conduction loss from the filament and, therefore, the filament temperature varies as a function of pressure. Thermal conduction vacuum gauges currently in use may include Pirani vacuum gauges, thermocouple vacuum gauges, and convection vacuum gauges. In the Pirani vacuum gauge the temperature of the filament is found from its resistance while in the thermocouple vacuum gauge a junction of dissimilar metals provides a temperature-dependent output voltage. From the fundamental point of view, the Pirani and thermocouple gauges differ only in the means of observing the filament temperature.

While the above thermal conduction vacuum gauges typically exhibit high sensitivity in the range from $10^{-2}$ Torr to $10^0$ Torr, they have significantly lower sensitivity below $10^{-2}$ Torr because radiation losses, which are independent of pressure, become dominant in this pressure range. Furthermore, above $10^0$ Torr, the mean free path of gas molecules becomes so short as to form a hot air sheath around the filament, thus preventing further gaseous conduction and severely decreasing the sensitivity of the gauges. A convection vacuum gauge is a Pirani gauge with the additional capability (and thus additional complication and cost) of inducing a forced convection in order to improve the sensitivity above $10^0$ Torr.

SUMMARY OF THE INVENTION

To provide a better solution to the above problems than the existing gauges do, the present invention offers a new thermal conduction vacuum gauge capable of operating at high sensitivity over a wide range of pressure and having a simple structure and a micron-size.

Specifically, to achieve the above objects, the present invention offers a vacuum gauge using a Peltier tip including: a signal generator that drives an electric current into the Peltier tip; an ammeter connected to the signal generator for measuring the current; a bridge circuit, which is connected to the ammeter, consisting of thermocouple wires and a variable resistor, wherein one junction of dissimilar metallic wires is made in the form of a Peltier tip, inserted into a vacuum chamber; and a lock-in amplifier connected to the two symmetrical points of the bridge circuit for detecting a voltage signal due to the temperature oscillation at the Peltier tip and thus measuring the pressure in the vacuum chamber.

The vacuum gauge according to the present invention uses only one junction of dissimilar thermocouple wires as a heater and sensor, i.e., the junction works as a heat source and temperature sensor simultaneously, thereby reducing the overall size of the gauge and increasing the sensitivity thereof.

BRIEF DESCRIPTION OF THE DRAWINGS

The above objective and advantages of the present invention will become more apparent by describing in detail a preferred embodiment thereof with reference to the attached drawings in which.

DETAILED DESCRIPTION OF THE INVENTION

A conventional thermal conduction vacuum gauge consists of a filament and a temperature sensor for measuring the temperature thereof. The filament is heated by Joule heating, and a thermocouple or the resistance of the filament is used as a temperature sensor. On the other hand, a thermal conduction vacuum gauge according to the present invention is comprised of one thermocouple only, and the thermocouple works as both a heat source and a temperature sensor, thus reducing the overall size of the gauge and increasing the sensitivity thereof.

Figure 1:
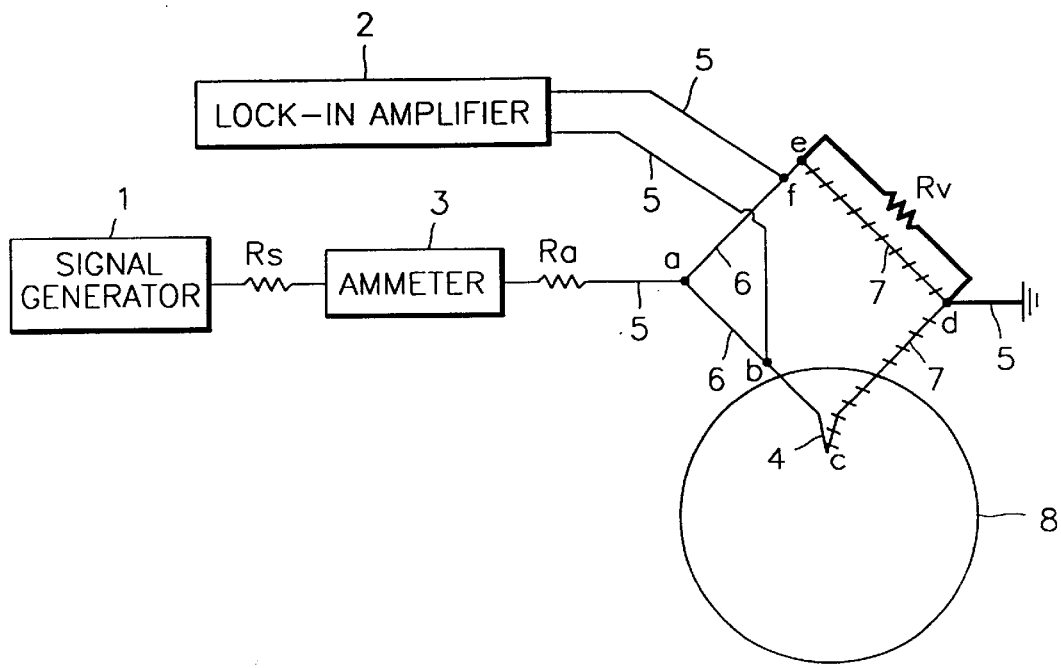
FIG. 1 shows the configuration of a vacuum gauge using a Peltier tip and the associated measuring circuit according to the present invention.

Referring to FIG. 1, a vacuum gauge using a Peltier tip and its associated detection circuit according to the present invention include a signal generator 1, a lock-in amplifier 2, an ammeter 3, and a bridge. The bridge consists of two dissimilar metallic wires 6 and 7, as shown in the figure, and a variable resistor Rv. Two junctions of dissimilar metals (c and e in FIG. 1) are formed in the bridge.

More specifically, the signal generator 1 with output resistance Rs is connected to one terminal of the ammeter 3 with internal resistance Ra. The other terminal of the ammeter 3 is then connected via copper wire 5 to the central point (a in FIG. 1) of the metallic wire 6. One junction in the bridge (c in FIG. 1) is in the form of the Peltier tip. The central point of the metallic wire 7 (d in FIG. 1) is grounded. To eliminate an Ohmic voltage drop, a variable resistor Rv is added to the bridge between d and e.

The lock-in amplifier 2 is connected to a point b of the Peltier tip 4 and a point f, and the Peltier tip 4 is inserted into a vacuum chamber 8 where the pressure will be measured.

The locations of points in the bridge circuit connected to the lock-in amplifier 2 will now be described. Typically, in measuring an AC voltage across the ends of a resistor when a current flows, second and third harmonic signals as well as a fundamental harmonic signal are generated by Joule heating. The second and third harmonic signals have small amplitudes that are proportional to the temperature coefficient of the resistor. When a signal to be measured is of very small amplitude, the measurement may be affected by these higher harmonics. Also, as frequency increases, the amplitude of the harmonics produced by the impedance of circuit components increases in proportion to the frequency. Thus, it is essential to connect the points b and f of the bridge, which are symmetric points of the bridge, to the lock-in amplifier 2 in eliminating these unnecessary harmonic signals.

Figure 2:
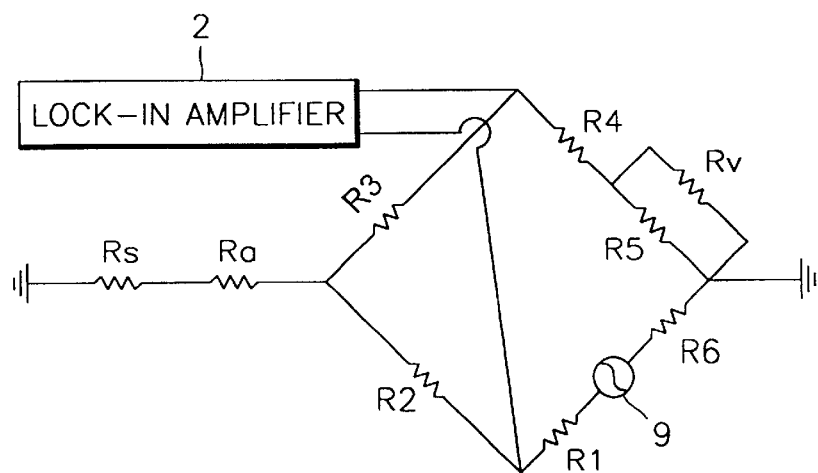
FIG. 2 is an equivalent circuit showing a temperature oscillation of the vacuum gauge using the Peltier tip of FIG. 1.

FIG. 2 is an equivalent circuit showing the signal due to a temperature oscillation of the vacuum gauge using the Peltier tip of FIG. 1. In the equivalent circuit of FIG. 2, junction point (c in FIG. 1) of the Peltier tip 4 can be replaced with a thermal signal generator 9 since the temperature oscillation is converted into a voltage oscillation by the Seebeck effect.

If the junction point e of FIG. 1 is thermally grounded, the lock-in amplifier 2, which measures the voltage between the points b and f, reads the temperature oscillation of the Peltier tip 4 corresponding to the pressure of the vacuum chamber 8. Here, R1 denotes the resistance of the metallic wire 6 between the points b and c of FIG. 1 and R2 denotes the resistance of the metallic wire 6 between the points a and b. R3 denotes the resistance of the metallic wire 6 between the points a and f, and R4 denotes the resistance of the metallic wire 6 between the points e and f. R5 denotes the resistance of the metallic wire 7 between the points d and e, and R6 denotes the resistance of the metallic wire 7 between the points c and d. Ra, Rs, and Rv denote the internal resistance of the ammeter 3, the output resistance of the signal generator 1, and the variable resistance, respectively.

The Peltier effect refers to a phenomenon in which, when an electric current passes through a thermocouple consisting of dissimilar metallic wires at a constant temperature T, a power P is generated at the junction of the thermocouple due to electrochemical potential differences between the two conductors, as expressed by Equation (1):

$$P = TSI \qquad (1)$$

where S denotes a difference in the thermoelectric power between the two metallic wires of the thermocouple and I denotes the electric current. Thus, the junction of a thermocouple may be heated or cooled depending on the direction of current I.

From the tabulated values S for various pairs of metallic wires (thermocouples) at an arbitrary temperature, the power oscillation with respect to a specific current can be precisely calculated.

It is stressed that a heat source created by the Peltier effect is a point source in which heat exchange occurs only at the junction point of a thermocouple. Another important feature of the Peltier source is that the junction can be heated or cooled depending on the direction of current I. Thus, in the case of AC heating, a DC offset does not exist unlike other heating sources such as Joule heating and light heating.

Examples of a thermocouple consisting of different metallic wires 6 and 7 may include a J-type thermocouple, which is an iron (Fe)—constantan (Cu—Ni) junction, a K-type thermocouple, which is a chromel (Ni—Cr)—alumel (Ni—Al), a T-type thermocouple, which is a copper (Cu)—constantan (Cu—Ni) junction, an E-type thermocouple, which is a chromel (Ni—Cr)—constantan (Cu—Ni) junction, an N-type thermocouple, which is a nicosil (Ni—Cr—Si)—nisil (Ni—Si—Mg) junction, R- and S-type thermocouples, which are platinum (Pt)—platinum (Pt) and rhodium (Rh) alloy junctions, and G- C- and D-type thermocouples, which are a tungsten (W)—tungsten (W) and rhenium (Re) alloy junction. A choice from these thermocouples should be made depending on the sensitivity for a given temperature range.

The Peltier tip 4 of the bridge is made of dissimilar metallic wires (6 and 7 of FIG. 1) having a diameter of several to tens of micrometer. The signal generator 1, the lock-in amplifier 2, and the ammeter 3 are connected to the bridge via copper wires 5, and the copper wires 5 are thick enough to have negligible resistance.

When the signal generator 1 drives a current at a specific frequency, the current is input to the bridge through the ammeter 3. In the bridge, the current passes through the two routes, a-f-e-d and a-b-c-d, to ground. Junctions of dissimilar thermocouple wires 6 and 7 are formed at c and e, while points a, b, d, and f are the junctions between a copper wire 5 and a thermocouple wire. Temperature oscillations should occur at the junctions of dissimilar metals a, c, d and e due the Peltier effect. The amplitudes of these temperature oscillations would vary depending on various conditions such as heat capacity and thermal conductivity of the metallic wires, thermal oscillation frequency, and thermal environment surrounding the junctions. Here, the junction points a, b, d, and f are junctions between the copper wire 5 having high thermal conductivity and either of the metallic wires 6 and 7, and the points a, b, d, and f are thermally grounded to metal blocks such as silver and copper to eliminate temperature oscillations at these junction points.

While the above treatment is sufficient to suppress unwanted signals for junctions a, b, d, and f, the junction e may be treated in two ways. A first method is that the junction point e is thermally grounded just in the same way as the junction points a, b, d, and f are grounded. In this case, temperature oscillation occurs only at junction point c. The temperature oscillation results in a voltage oscillation due to the Seebeck effect at that junction point. The lock-in amplifier 2 reads the difference in voltage between the junction points b and f. As can be seen from FIG. 1, the voltage difference measured by the lock-in amplifier 2 is caused not only by a temperature oscillation in the Peltier tip 4 but also by a Ohmic voltage. However, this voltage due to the Ohmic drop across the wires can be removed by carefully balancing the bridge with the variable resistor Rv. Thus, only the voltage induced by the temperature oscillation in the Peltier tip 4 can be measured.

A second method is that the junction e is also made in the form of the Peltier tip like the junction c. In this case, temperature oscillations are generated both at the junction c located in the vacuum chamber 8 and at the junction e which is placed at the reference pressure. Since the lock-in amplifier 2 reads only the difference between the temperature oscillations at junction points c and e, the temperature oscillation due to the difference in pressure at the junction points c and e is obtained. In this differential mode, the pressure below $10^{-2}$ Torr can be measured with high sensitivity.

The vacuum gauge using the Peltier tip according to the present invention may operate in the DC-mode or AC-mode. Generally the AC-mode may be preferred due to the fact that one can select the operating frequency which yields the highest sensitivity for a given pressure range. Also, the vacuum gauge using the Peltier tip according to the present invention may operate in one of the following two ways. That is, the vacuum gauge may measure the temperature (determined by pressure) when a constant amount of power is supplied to the Peltier tip or measure the power needed to keep the temperature of the Peltier tip constant as pressure varies.

The vacuum gauge using the Peltier tip according to the present invention has several advantages over conventional thermal conduction vacuum gauges. First, the vacuum gauge according to the present invention has a simple structure, since the junction of a thermocouple works as both a heat source and a temperature sensor simultaneously. Second, particularly sensitive vacuum measurements can be made in the range from $10^0$ Torr to atmospheric pressure, because the spherical heat diffusion of this gauge is more effective than the cylindrical heat diffusion of conventional gauges. Furthermore, the junction may be not only heated but also cooled by the Peltier effect, thereby preventing the formation of a hot air sheath. Third, vacuum measurements in the range from $10^{-4}$ to $10^{-2}$ Torr can be made with the present gauge at much higher sensitivity than with conventional gauges. In the measurements of pressure below $10^{-2}$ Torr, a conventional thermal conduction vacuum gauge suffers from the fact that the gaseous thermal conduction becomes much smaller than that by radiation. On the other hand, the vacuum gauge using the Peltier tip according to the present invention can use two thermocouples in the vacuum chamber and at the atmospheric pressure, respectively, in the differential mode to measure solely gaseous conduction by canceling radiation heat losses, thereby providing high sensitivity in low pressure range. Fourth, since a vacuum gauge can be comprised of a single thermocouple, it can be manufactured up to several tens of nanometers, thereby facilitating local vacuum measurement of a vacuum chamber. Finally, the size of the heat source and temperature sensor is reduced as much as possible, thereby quickly measuring changes in pressure.

As described above, a thermal conduction vacuum gauge according to the present invention using a Peltier tip has a simple structure, and is of micron size, and operates at high sensitivity over a wide range of pressure, thereby measuring the pressure quickly at high resolution while facilitating local vacuum measurements.

What is claimed is:

1. An apparatus for measuring pressure in a vacuum chamber, the apparatus comprising:

a signal generator producing an electric current;

an ammeter connected to the signal generator for measuring the electric current;

a bridge circuit including a plurality of junctions of dissimilar metallic wires and a plurality of junctions of similar metallic wires, and connected to the ammeter, wherein one of the junctions of dissimilar metallic wires is a Peltier tip for insertion into a vacuum chamber for measuring pressure in the vacuum chamber; and a lock-in amplifier connected to two symmetrical nodes of the bridge circuit for detecting a voltage signal due to temperature oscillation at the Peltier tip and thus measuring pressure in the vacuum chamber.

2. The apparatus of claim 1, including a correction resistor connected in parallel with one arm of the bridge circuit compensating an Ohmic voltage caused by resistance of an arm of the bridge circuit to which the correction resistor is connected.

3. An apparatus for measuring pressure in a vacuum chamber, the apparatus comprising:

a signal generator producing an electric current;

an ammeter connected to the signal generator for measuring the electric current;

a bridge circuit including first and second arms of a first wire having a first composition and third and fourth arms of a second wire having a second composition different from the first composition, the first, second, third, and fourth arms being connected in the bridge circuit with two junctions of the first and second wires, one junction of the first wires, and one junction of the second wires, the junctions of the first and second wires forming Peltier tips, one of the Peltier tips for insertion into a vacuum chamber for measuring pressure within the vacuum chamber; and a lock-in amplifier connected across the junction of the first wires and the junction of the second wires of the bridge circuit for detecting a voltage signal due to temperature oscillation at the Peltier tip inserted in the vacuum chamber and thus measuring pressure in the vacuum chamber.

4. The apparatus of claim 3, including a correction resistor connected in parallel with one of the arms of the bridge circuit in order to compensating an Ohmic voltage caused by resistance of the arm of the bridge circuit to which the correction resistor is connected.

* * * * *